UNITED STATES PATENT OFFICE.

EDWARD J. T. DIGBY, OF LONDON, ASSIGNOR TO GEORGE HENRY SKELSEY, OF LIVERPOOL, ENGLAND.

PROCESS OF MAKING SOAP.

SPECIFICATION forming part of Letters Patent No. 551,723, dated December 17, 1895.

Application filed September 5, 1893. Serial No. 484,847. (No specimens.) Patented in England, No. 20,590 of 1891.

*To all whom it may concern:*

Be it known that I, EDWARD JOHN THEODORE DIGBY, a subject of the Queen of Great Britain and Ireland, residing at the city of London, England, have invented new and useful Improvements in the Process of Manufacturing Soap, (for which I have obtained Letters Patent in Great Britain, No. 20,590 of 1891,) of which the following is a specification.

This invention has for its object to provide a new and improved process for manufacturing soap, and it consists essentially in taking oyster-shells and removing therefrom the discolored or slimy parts by alkali or acid, then reducing such shells to impalpable powder, then boiling this powder in an alkali, and subsequently adding such treated shell product to ordinary soap-stock and thoroughly mixing the same therewith, as will more fully hereinafter appear.

In carrying out this invention—i. e., in making this soap—I employ the following methods of manufacture, and at present these are the best of which I am aware for producing it.

The oyster-shells (or equivalent shells) have first the dark and slimy part removed from their backs, and this may be effected by caustic soda, acetic acid or an equivalent. This is in one way effected by boiling them well in a solution of the alkali or acid (or its equivalent) and water in the proportions of one part of the alkali or acid (or other equivalent) and three parts of water. I then grind or reduce the shells into an impalpable or as fine a powder as possible. Before reduction to powder I may, and prefer to, dry the shells artificially. This may be done by placing them in an oven or kiln moderately heated until the sap or moisture in them has been evaporated. After this the reduced shell is treated in an alkali, such as caustic soda or potash, or sulphate of potash, or soda, or any other suitable equivalent substance. In effecting this operation the reduced shell is placed in a vessel and sufficient water to cover it is poured over it. To this is added the alkali, which is mixed with the bulk of powdered oyster-shell (or equivalent shell) in the proportions of about six pounds of the alkali or other equivalent substance to twenty hundred weight of the powdered shell. The mass is preferably then boiled from about six to twelve hours until it is dissolved into a fine paste, and this paste in proportions such as hereinafter specified is added (preferably gradually) to and mixed with the soap-stock—i. e., the other ingredients commonly used in the manufacture of soap—while in a boiling state, and constitutes when ready for use the improved soap under this invention, the oyster-shell portion (or equivalent shells) imparting great hygienic and detergent properties to the soap. Moreover, the soap, weight for weight, is much cheaper than other soap as ordinarily manufactured.

The proportions of shell produce and soap-stock will vary according to quality from about twenty-five per cent. to eighty per cent. by weight. For instance in "toilet soap" the shell-product portion will be about twenty-five per cent., while in other qualities they may be about the following: household soap, thirty-three per cent.; soft soap, forty per cent.; dry soap, fifty per cent.; silver and like soaps, eighty per cent. The invention, however, is not restricted to the precise proportions absolutely.

What is claimed in respect of the herein-described invention is—

The herein described process of manufacturing soap, which consists in taking oyster shells, and removing therefrom the discolored or slimy parts by alkali or acid, then reducing such shells to impalpable powder, then boiling said powder in an alkali as specified, and subsequently adding such treated shell product to ordinary soap-stock, and thoroughly mixing the same therewith, substantially as specified.

In testimony whereof I have hereunto set my signature in the presence of two witnesses.

EDWARD J. T. DIGBY.

Witnesses:
ERNEST R. ROYSTON,
GEO. H. SKELSEY.